United States Patent [19]

Turner

[11] Patent Number: 5,530,333
[45] Date of Patent: Jun. 25, 1996

[54] CONTROL OF AN INDUCTIVE LOAD

[75] Inventor: Michael J. Turner, Leeds, England

[73] Assignee: Switched Reluctance Drives Limited, Leeds, England

[21] Appl. No.: 274,548

[22] Filed: Jul. 13, 1994

[30] Foreign Application Priority Data

Jul. 20, 1993 [GB] United Kingdom ............. 9314995

[51] Int. Cl.$^6$ .................................. H02P 1/46
[52] U.S. Cl. .................. 318/701; 318/254; 318/138; 318/439
[58] Field of Search ................. 318/701, 138, 318/254, 439

[56] References Cited

U.S. PATENT DOCUMENTS

| | | | |
|---|---|---|---|
| 4,339,703 | 7/1982 | Rolffe et al. ............ | 318/701 |
| 4,710,815 | 12/1987 | Douglas et al. .......... | 318/701 |
| 4,713,594 | 12/1987 | Bose et al. . | |
| 4,933,621 | 6/1990 | MacMinn et al. ......... | 318/701 |
| 5,166,591 | 11/1992 | Stephens et al. . | |

FOREIGN PATENT DOCUMENTS

| | | |
|---|---|---|
| 0259005A1 | 3/1988 | European Pat. Off. . |
| 0397514A2 | 11/1990 | European Pat. Off. . |
| 0613235A1 | 8/1994 | European Pat. Off. . |
| 2217970 | 10/1972 | Germany . |

*Primary Examiner*—William M. Shoop, Jr.
*Assistant Examiner*—Karen Masih
*Attorney, Agent, or Firm*—Patterson & Keough

[57] ABSTRACT

A switched reluctance motor controller derives an error signal from the difference between a phase winding current reference and the phase winding current. The error signal is applied to a pair of hysteresis circuits which define adjacent hysteresis bands above and below the reference current. The outputs of the hysteresis circuits are received by control logic which permits current to be applied to the phase winding when the current is below the hysteresis bands, removes current from the phase winding when the current is above the hysteresis bands and allows the phase winding current to freewheel when the current is between the upper and lower hysteresis limits.

23 Claims, 9 Drawing Sheets

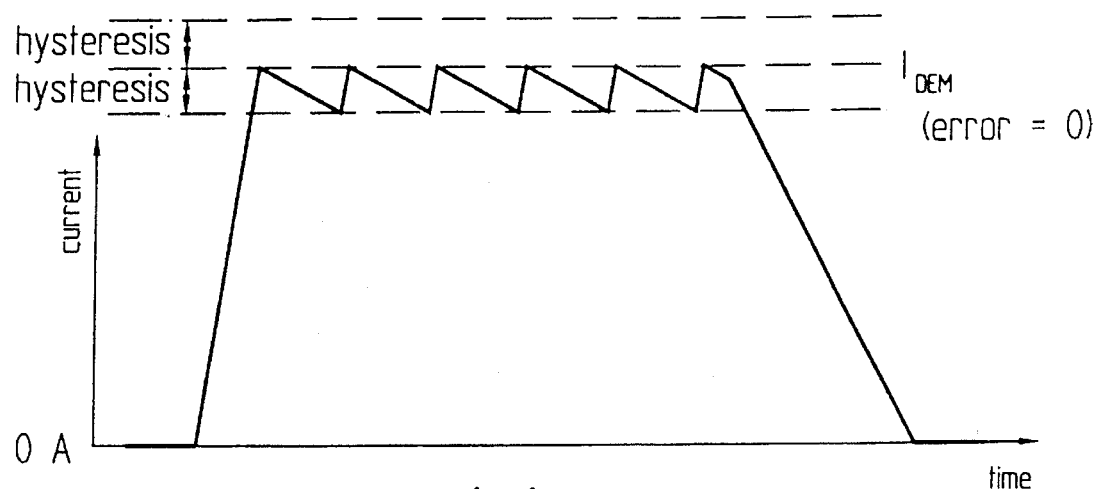
FIG. 7(b)
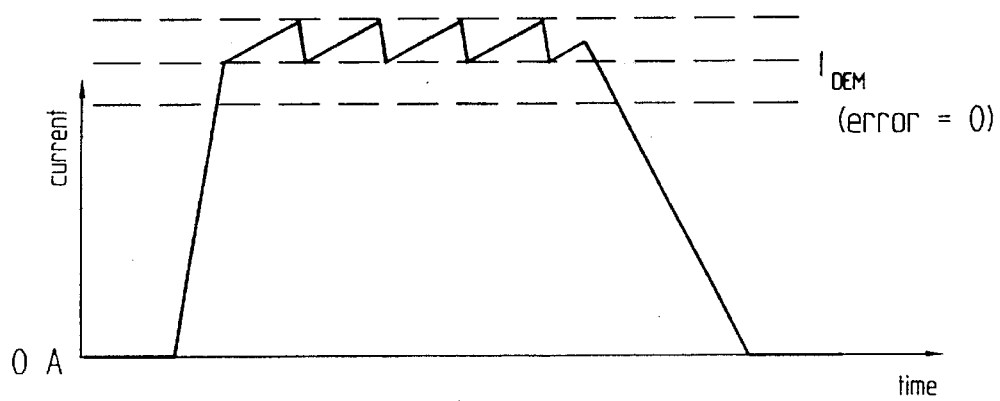
FIG. 7(c)
| X | Y | POWER STATE | REMARK |
|---|---|---|---|
| 0 | 0 | ON | Current too low |
| 0 | 1 | FW | Illegal condition |
| 1 | 0 | FW | Current within bounds |
| 1 | 1 | OFF | Current too high |
FIG. 7(d)

CONTROL OF AN INDUCTIVE LOAD

BACKGROUND OF THE INVENTION

1. Field of the Invention

This invention relates to controllers for loads of varying inductance, such as switched reluctance machines. The invention also relates to a hysteresis circuit.

2. Description of Related Art

A switched reluctance motor is an example of an electrical load in which the inductance is not constant with time or machine operation, i.e. rotor angle. FIG. 1(a) illustrates a typical three-phase switched reluctance (SR) machine and FIGS. 1(b) and (c) illustrate well-known examples of electronic switching circuits which may be used to control an SR machine. The SR machine essentially consists of a stator s defining stator poles 1, 1', 2, 2', 3, 3' on which are wound phase windings w, of which only one is shown in association with a set of poles 2, 2'. The machine also has a rotor r with salient poles 4, 4' and 5, 5'. The electronic circuits are arranged to supply unidirectional currents to the phase windings w.

In the control circuits of FIGS. 1(b) and (c), each phase winding of the machine in FIG. 1(a) is associated with a circuit leg comprising at least one electronic switch t in series with each winding across a dc supply Vs. A general treatment of the principles of SR machines is given in the paper 'The Characteristics, Design and Applications of Switched Reluctance Motors and Drives' by Stephenson et al. presented at PCIM'93 Conference and Exhibition at Nurnberg, Germany, Jun. 21st–24th 1993.

Proposed means for controlling an SR machine to run at different speeds include operation in three characteristic regions which can be designated as 'low-speed', 'medium-speed' and 'high-speed' regions. For background and explanation on this see 'Variable-Speed Switched Reluctance Motors' by Lawrenson et al. IEE Proceedings Part B, Vol.127, No.4, July 1980. In the low-speed region the current is controlled by the well-known method of 'chopping'. The present invention relates to improvements in the means of implementing chop control of the phase current.

FIGS. 2(a), (b) and (c) represent one phase leg of the circuit shown in FIG. 1(b) redrawn for clarity with the phase leg in its three possible states. Here referred to as 'ON', 'FW' ('freewheeling') and 'OFF'. The power switches shown (referred hereinafter as 'top switch' and 'bottom switch') may be, for example, bipolar, insulated gate or MOS field effect transistors, gate turn-off thyristors or other power switch means, as is well understood in the art. The power switches are assumed to be operated by suitable driving circuits, as is usual in the art—for clarity these are not shown in the figures. The controller diagrams (FIGS. 4 and 6) therefore show command signals for top and bottom power switches, which are assumed to be transmitted to the switches via the aforementioned driving circuits. The circuit is in the ON state when both power switches are closed and the full dc bus voltage Vs is applied to the phase winding w, increasing the flux $\Phi$ at the maximum possible rate (see FIG. 2(a)).

When flux has been established in the winding in this way and either one of the switches is open, the current is said to freewheel (see FIG. 2(b)), i.e. the circuit is in the FW state with only one switch closed, the current flowing through this switch and one diode. The effective winding voltage is determined by the small voltage across the switch, the diode and the winding resistance. The flux $\Phi$ thus falls relatively slowly, as shown in FIG. 2(b).

The circuit is in the OFF condition when both switches are open and the phase current is carried by the diodes. The winding then has the full dc bus voltage applied in reverse so that the flux $\Phi$ will fall until the current is zero and the diodes become non-conducting (see FIG. 2(c)).

The simplest method of current chopping is to alternate between ON and OFF states to maintain the mean current level near a desired value. This is shown in FIG. 3(a). Chopping between the ON and OFF states is useful at low power levels where the switches (e.g. semiconductor switches such as metal oxide silicon dioxide field effect transistors or insulated gate bipolar transistors) can switch at ultrasonic frequencies. This is advantageous in terms of limiting acoustic noise.

At higher power levels however, the losses (both in the semi-conductor switches and other components) associated with ultrasonic switching become large and it is usually necessary to reduce the switching frequency. If the ON/OFF strategy were used the current (and the flux) excursions at these reduced frequencies might be large, resulting in a rise in objectionable acoustic noise and, possibly, control problems as well. For these reasons the FW state is often incorporated into the switching pattern, enabling retention of relatively small current excursions even though the switching frequency is reduced. This is shown in FIG. 3(b) for a 'motoring' mode and in FIG. 3(c) for a 'generating' mode.

The behaviour of the winding current is determined not only by the applied voltage but also by the phase inductance which is a function of the rotation of the machine. Inductance is defined as flux linkage per unit current so that $L \propto \Phi/I$, hence $I \propto \Phi/L$. If the effective winding voltage during freewheeling is small, the flux can be considered constant over a short period and the current will follow the reciprocal of the inductance profile, i.e. the freewheeling current will reduce when the inductance rises and increase with falling inductance. At low rotational speeds, however, the rate of change of inductance with time (dL/dt) is small and the reduction in flux with time during freewheeling becomes significant over a machine phase period. At very low speeds, the freewheeling current will fall even when the inductance is decreasing, because a small winding voltage causes the flux to fall faster than the inductance. The behaviour of the freewheeling current under these differing conditions has important consequences for the current control system as the controller has to be able to function correctly in all these different conditions.

In the prior art, the control considerations described above have been implemented in a variety of ways, each with its own advantages and disadvantages.

In the prior art, simple current controllers using freewheeling do not cater to the case where the phase current rises during freewheeling (e.g. MacMinn, U.S. Pat. No. 4,933,621). This is acceptable where the switched reluctance machine is never required to operate as a regenerative brake. It is inadequate, however, when attempting to control the phase current during regenerative braking, because under these conditions the machine's phases will be energized while their inductance is falling, which (as explained above and shown in FIG. 3(c)) results in a rising freewheel current at all but the lowest rotational speeds. With the MacMinn controller, the freewheel current under regenerative conditions would rise in an uncontrolled manner, resulting in unacceptable performance of the machine and/or possible damage to the power electronics and/or motor windings.

A known extension of the simple scheme is shown in FIG. 4, where additional control logic is used to modify the power switch commands when the switched reluctance machine is known to be operating in the braking mode. A conventional hysteresis controller is shown, using one comparator for each phase, the current feedback being compared directly with the reference (demand) value. A hysteresis band separates the switching points. The width of this band is usually varied to provide a suitable compromise between current excursions, switching frequency and acoustic noise.

In a motoring mode (i.e. in which the net power flow is from the source to the load), the controller chops simply by alternating between ON and FW, with both switches switched off at the end of the phase period. FIG. 5(a) shows a typical current waveform. The change from motoring to a generating mode requires the MOT/GEN logic signal shown in FIG. 4. In the generating mode (i.e. in which the net power flow is from the load to the source), the controller chops by alternating between FW and OFF. FIG. 5 (b) shows a typical current waveform.

While this system has the advantages of using only one comparator and only one hysteresis band, it has a number of disadvantages. These are particularly apparent at low-speeds whilst generating. Because the generating freewheel current rises only if the speed is high enough, at low speeds (particularly at high currents when the effective freewheel winding voltage is greatest) the current decays to zero as illustrated in FIG. 5(c). The output of the generator is then reduced. A further drawback is the dependence on a logic signal for switching between motoring and generating modes. This signal may be difficult to generate reliably especially during transient conditions. This may lead to loss of control of the current resulting in nuisance tripping or even switch failure.

A second proposed system seeks to overcome these difficulties by using two comparators. The two comparators have the same reference, but the hysteresis band of one spans that the other, as shown in FIG. 6(a). Essentially, the 'outer' comparator is used to control the operation of the 'inner' comparator so that, for most of the time, chopping occurs between the switching points of the inner comparator only. The power switches are switched off at the end of the phase period as before. In the motoring mode, this system behaves like the single comparator case and chopping is controlled by the inner hysteresis band only, as shown in FIG. 6(b).

In the generating mode, the controller starts in the same mode with both switches closed until the current reaches the upper level of the inner comparator, whereupon one switch is opened and the phase freewheels. The freewheel current rises further (because the system is generating) until the upper level of the outer comparator is reached whereupon the second switch is also opened. The inner comparator now operates in the generating mode, selecting either FW or OFF. Chopping continues on the inner band unless the current fails to rise when the circuit is in the FW state and decays to the lower level of the inner comparator. In this case, if the current falls to the lower level of the outer comparator and both switches are closed, the resulting ON state raises the current into the control band of the inner comparator. This is illustrated in FIG. 6(c).

This system has some advantages. For example, it keeps control of the current at all times, irrespective of whether the drive is motoring or generating and has no problems of discontinuities at low speeds.

However, it has disadvantages which may render it of little value in some applications. It suffers from large transient excursions of current which may be objectionable in some applications. Also, the outer band must generally be wide so as to keep it reliably distinct from the inner one over the full working range of current despite noise, drift or other possible sources of signal corruption.

SUMMARY OF THE INVENTION

According to the invention there is provided a controller for a time variable inductive load, the controller comprising:

means for deriving an error signal which is the difference between a reference signal indicative of a reference current and a feedback signal indicative of the load current;

switch means which are actuatable into a freewheel arrangement in which current recirculates around the load;

switch control means for closing the switch means when the load current is below a low current bound below the reference current, for opening the switch means when the load current is above an upper current bound above the reference current, and for actuating the freewheel arrangement of the switch means when the load current rises or falls to the reference current level from outside the lower and upper current bounds, respectively.

In one form of the present invention there is provided a controller for chopping control of a time variable inductive load, for example a switched reluctance machine which comprises a rotor, a stator, including at least one phase winding, constituting the load, for the or each phase of the machine, and switch means for controlling the supply of current to the load, the switch means being actuatable into a freewheel arrangement in which current recirculates around the load, the controller comprising:

means for producing an error signal which is the difference between a reference signal indicative of a reference current and a feedback signal indicative of the load current;

a lower hysteresis circuit having a lower hysteresis band defined between a first signal indicative of a lower current bound and the reference signal, the circuit being operable to change from one output level to another output level when the load current rises to the reference winding current level and to change from its other output level back to its one output level when load current falls to the lower current bound;

an upper hysteresis circuit having an upper hysteresis band defined between the reference signal and a second signal indicative of an upper current bound and being operable to change from one output level to another output level when the load current rises to the upper current bound and to change from its other output level to its one output level when the phase winding current falls to the reference current level; and a control circuit responsive to the outputs of the hysteresis circuits to produce control signals for actuating the switch means, such that the load current is controlled in response to the deviation of the load current from the reference current, according to the states of the outputs from the hysteresis circuits, by closing the switch means when the load current is below the lower current bound, opening the switch means when the current is above the upper current bound and actuating the freewheel arrangement of the switch means when the current rises or falls to the reference current level from outside the lower and upper current bounds, respectively.

Preferably, the means for producing an error signal include a comparator arranged to receive the reference and feedback signals.

Preferably, the control means are responsive to similar outputs from the hysteresis circuits to close the switch means when the error signal is indicative of a current below the lower current bound, are responsive to similar outputs of another value from the hysteresis circuits to open the switch means when the error signal is indicative of a current above the upper current bound and to actuate the freewheel arrangement when the outputs for the hysteresis circuits are dissimilar.

Preferably, the hysteresis circuits are each adjustable with respect to their respective hysteresis bands.

Preferably, each hysteresis circuit comprises a hysteresis comparator, having an inverting input to which the error signal is applied, a non-inverting input and an analogue switch actuatable by the output of the hysteresis comparator, the analogue switch being arranged in a positive feedback loop around the hysteresis comparator by which a hysteresis voltage is applicable as positive feedback, by actuation of the switch, according to the state of the output of the hysteresis comparator.

In one particular form the lower hysteresis circuit is arranged to receive a positive hysteresis voltage, the analogue switch associated with the lower hysteresis comparator being actuatable to apply the positive hysteresis voltage in response to a first signal applied to the analogue switch by the output of its hysteresis comparator, the upper hysteresis circuit being arranged to receive a negative hysteresis voltage, the analogue switch associated with the generating hysteresis comparator being actuatable by a second signal applied to the analogue switch by the output of its hysteresis comparator.

The invention provides a current controller configuration suitable for a switched reluctance machine which uses adjacent hysteresis bands. It works by being responsive to the current error rather than the absolute value and uses the principle of minimum possible action. If the error is within a given band the phase freewheels. If the error exceeds the band, then appropriate action is taken until the error is restored to zero. Freewheeling is then resumed. The error uses the two adjacent hysteresis bands centred about zero error, the hysteresis circuit associated with each band handling one polarity of error.

The invention also extends to a method of controlling the current in a time variable inductive load, the method comprising:

applying current to the load when the load current is below a lower current bound below a reference current level;

removing current from the load when the load current is above an upper current bound above the reference current level; and freewheeling current so that it recirculates through the load when the load current rises or falls to the reference current level from outside the lower and upper current bounds, respectively.

In a particular form a method of controlling a time variable inductive load in a chopping mode, for example a switched reluctance machine comprising a rotor, a stator including one phase winding for the or each phase of the machine, and winding switch means for switching current to the windings and being actuatable in a freewheel arrangement in which the winding current recirculates around the phase winding, the method comprises:

deriving an error signal indicative of the difference between a reference signal indicative of a reference current and a feedback signal indicative of the load current;

applying lower hysteresis control of the load current between the reference current and a lower current bound when the machine is motoring;

applying upper hysteresis control of the current between the reference current and an upper current bound when the machine is generating;

closing the switch means when the load current is below the lower current bound;

opening the switch means when the current is above the above upper current bound; and configuring the switch means in the freewheel arrangement when the current rises or falls to the reference current level from outside the lower and upper current bounds, respectively.

Also according to the invention there is provided a switchable hysteresis circuit comprising a comparator having a non-inverting input, an inverting input and an output providing a high or a low output signal which is dependent on the polarity of the difference between the values of the respective inputs, and an analogue switch actuatable by the output of the comparator to apply a hysteresis voltage as positive feedback to the non-inverting input of the comparator.

The switch may be actuatable by either a high or a low output from the comparator.

Preferably, the positive feedback further includes a first resistor connected between the non-inverting input and ground potential and a second resistor connected between the non-inverting input and the switch, providing a biassing network such that the hysteresis circuit has two thresholds determined by the biassing network in dependence on the state of the output of the comparator.

BRIEF DESCRIPTION OF THE DRAWINGS

The apparatus can be put into practice in various ways, some of which will now be described by way of example with reference to the accompanying drawings in which:

FIGS. 7 (b) and (c) are waveforms of winding current according to the circuit of FIG. 7(a);

FIG. 7(d) is a truth table for the control logic in the circuit of FIG. 7 (a)

DETAILED DESCRIPTION OF PREFERRED EMBODIMENTS

Figure 7A:
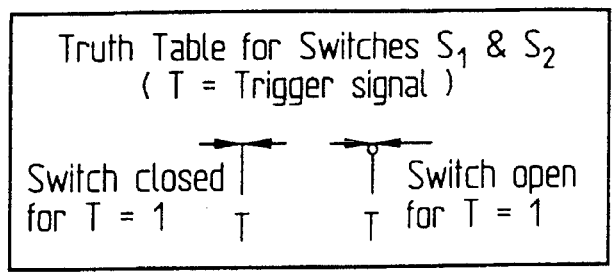
FIG. 7(a) is a schematic block diagram of a control circuit according to the present invention.
Figure 7A:
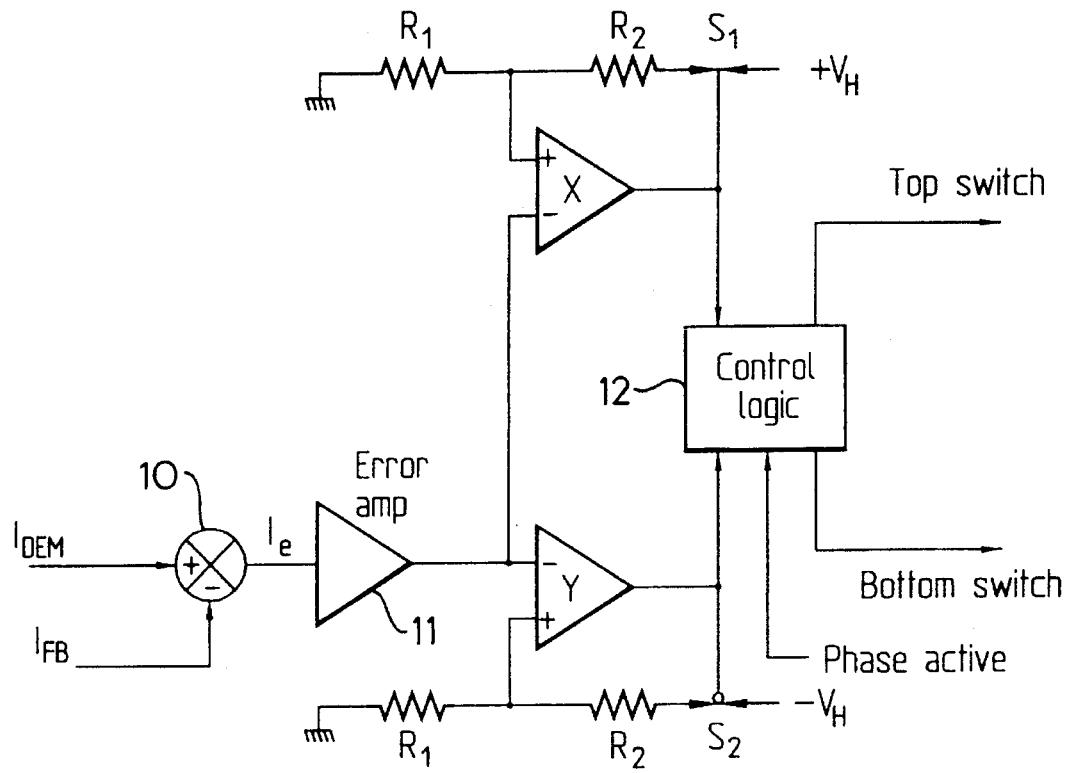
Figure 7E:
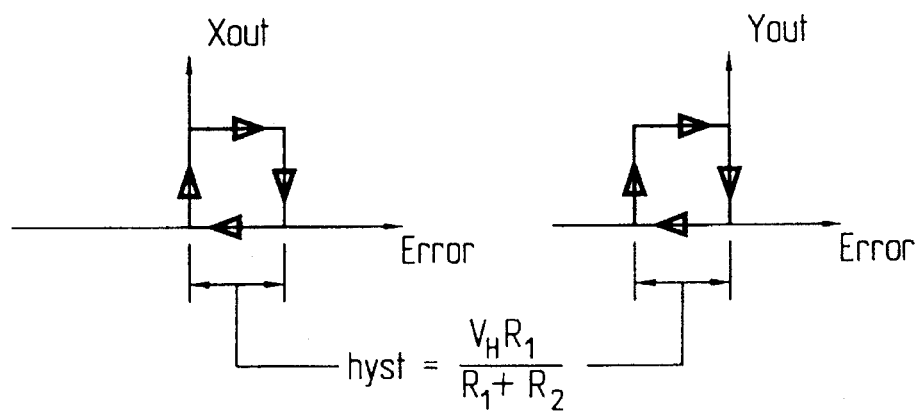
FIG. 7(e) shows comparator output vs. error.

Referring to FIG. 7(a) of the drawings, a current controller for a switched reluctance machine comprises a comparator in the form of a differencing amplifier 10 which receives a demand signal $I_{DEM}$ and a feedback signal $I_{FB}$ and produces an error signal Ie based on the difference between $I_{DEM}$ and $I_{FB}$. An amplifier 11 amplifies the error signal Ie. First and second comparators X and Y both receive the amplified error signal Ie at their respective inverting inputs. The first and second comparators each includes positive feedback comprising a resistive network formed by serially connected resistors R1 and R2 which are respectively connected between ground potential and one port of an associated solid state analogue switch S1/S2. In this embodiment the analogue switch S1 is a Siliconix DG418 and the analogue switch S2 is a Siliconix DG417. The non-inverting input of each comparator is connected between the resistors R1 and R2. The outputs of the comparators X and Y are connected to control logic 12 which is also fed with a 'phase active' timing signal which enables the outputs of the control logic in accordance with the phase inductance cycle of the rotor.

The control logic can be implemented as a hard wired construction. However, it may be microprocessor-based and possibly part of a larger controller governing the overall SR drive system.

Each of the analogue switches is also connected at a second port with one of a positive and a negative hysteresis voltage $+V_H/-V_H$. The analogue switches S1/S2 are actuated by their respective comparators X and Y. It will be noted that the analogue switch S1 is closed in response to a high output from the comparator X, whereas the analogue S2 is closed in response to a low output from the comparator Y.

The outputs from the comparators are also connected with inputs to the control logic 12. The outputs of the control logic 12 are respectively connected with the pairs of switches for a phase winding switch circuit such as that illustrated in FIG. 1(b).

Figure 1A:
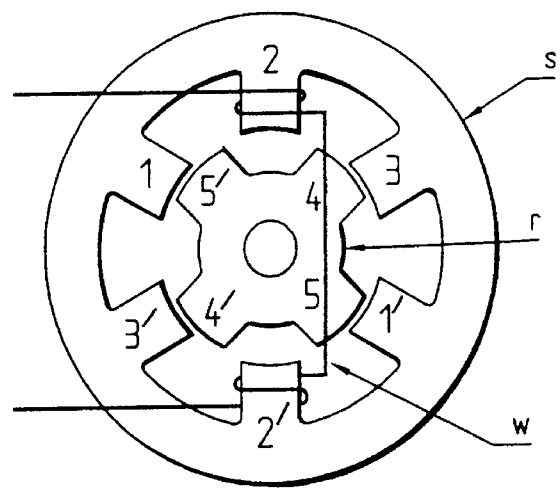
FIG. 1(a) is an end view of a doubly salient switched reluctance machine.
Figure 1B:
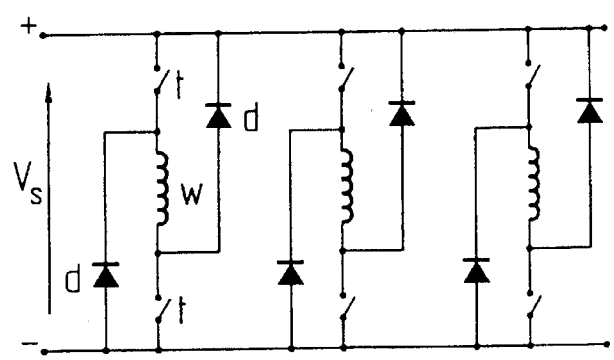
FIGS. 1(b) and (c) are circuit diagrams of known switched reluctance machine switching circuits.
Figure 1C:
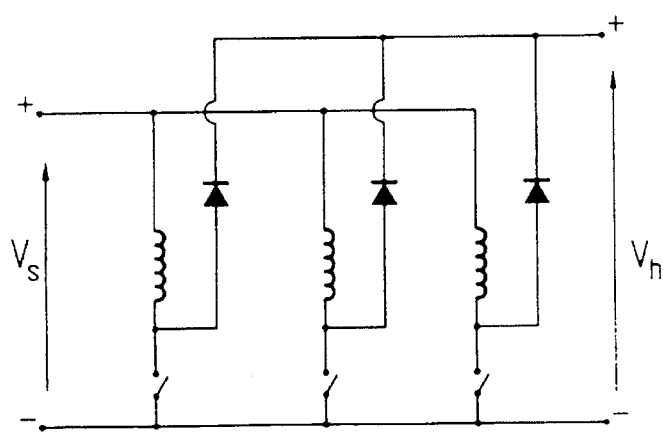
Figure 2A:
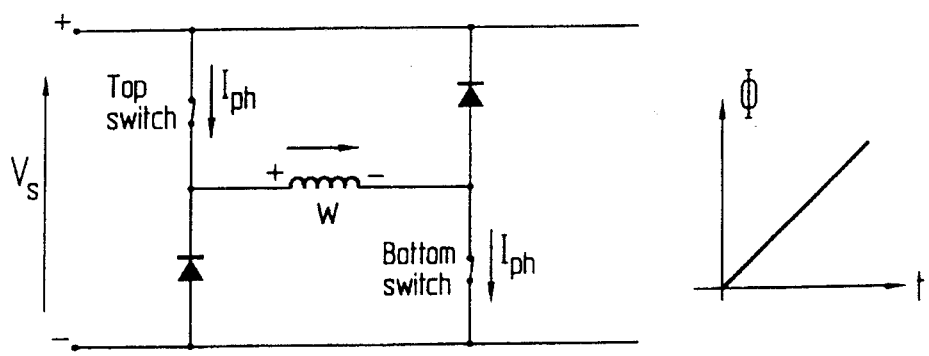
FIGS. 2(a) to (c) are circuit diagrams of the known switching circuits of FIG. 1(b) in its various switched states.
Figure 2B:
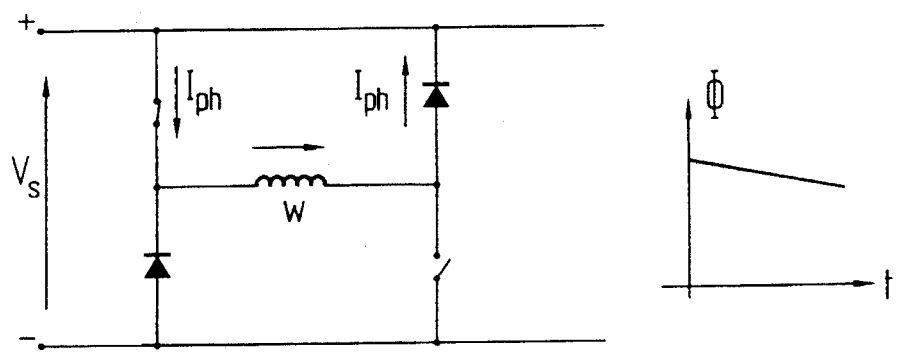
Figure 2C:
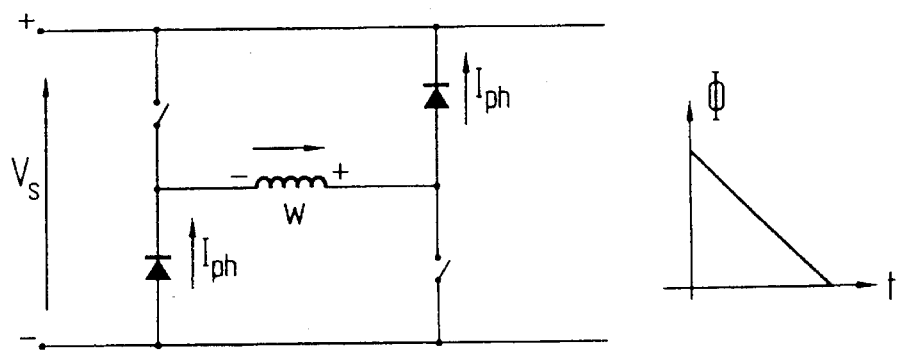
Figure 3A:
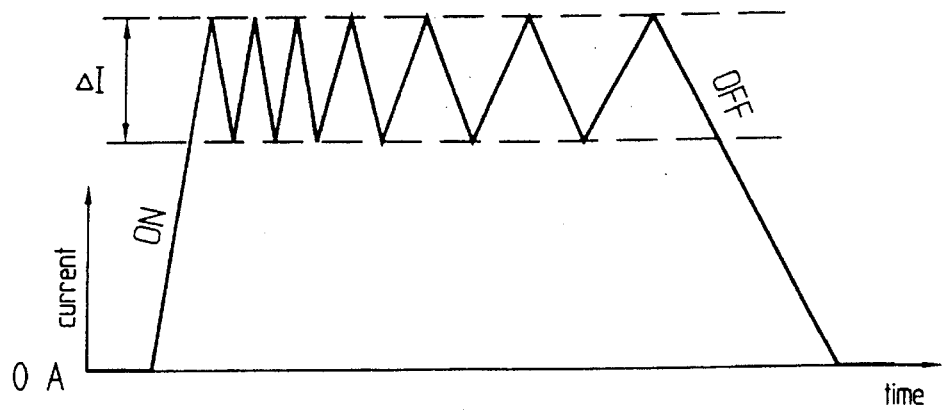
FIGS. 3(a) to (c) are graphs of typical chopping current waveforms.
Figure 3B:
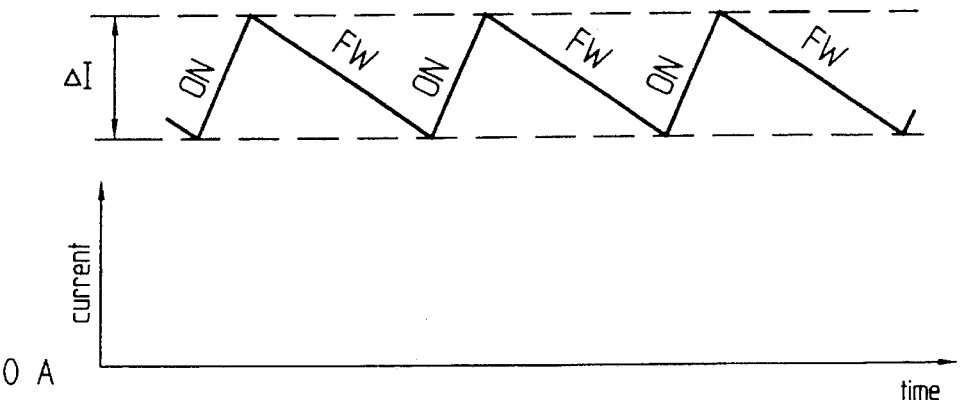
Figure 3C:
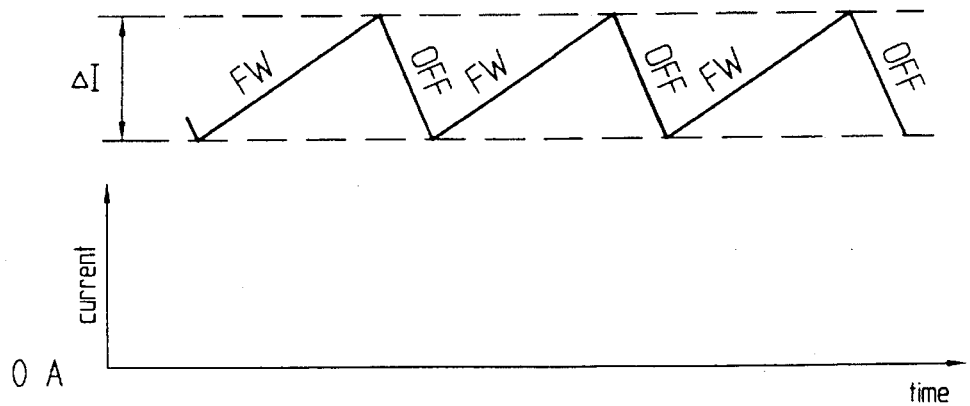
Figure 4:
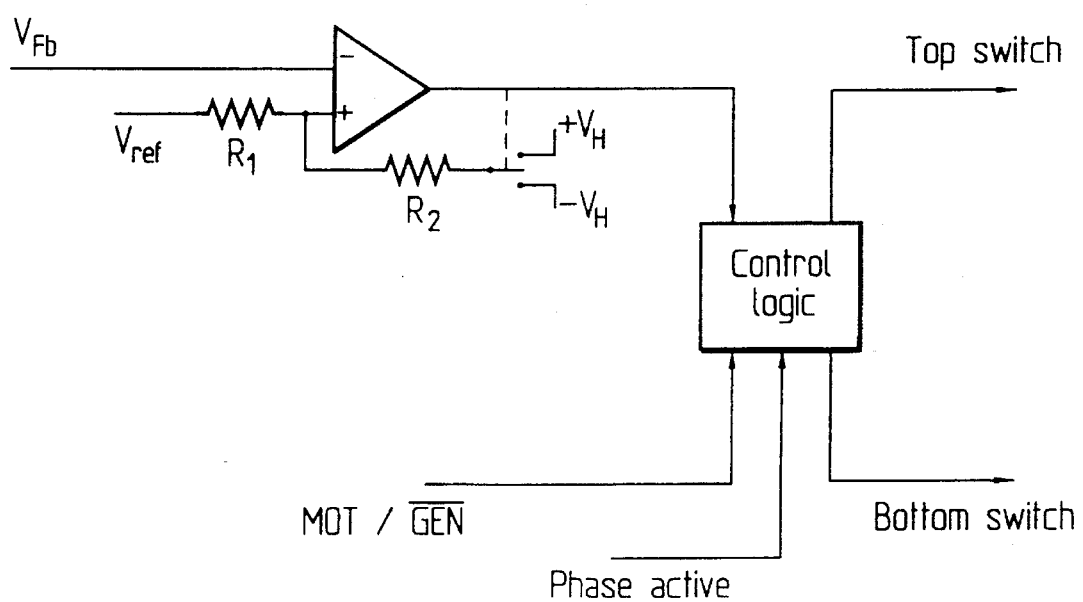
FIG. 4 is a schematic block diagram of a single comparator current controller for a switched reluctance machine.
Figure 5A:
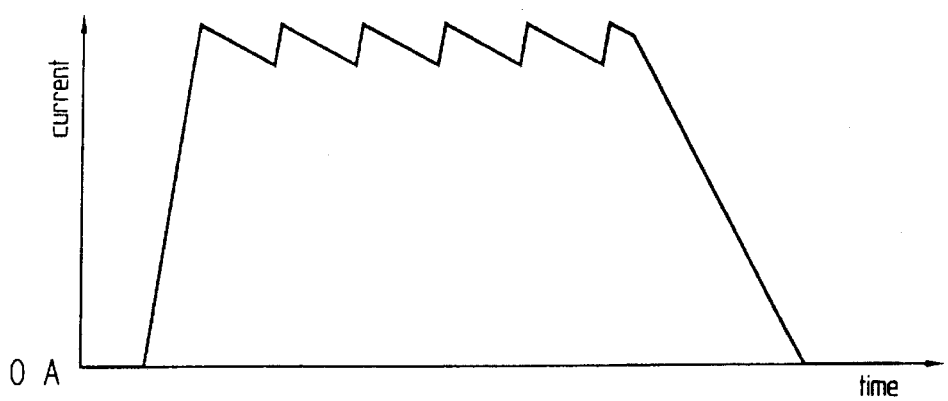
FIGS. 5(a) to (c) are typical waveforms of winding current according to the control applied by the circuit of FIG. 4.
Figure 5B:
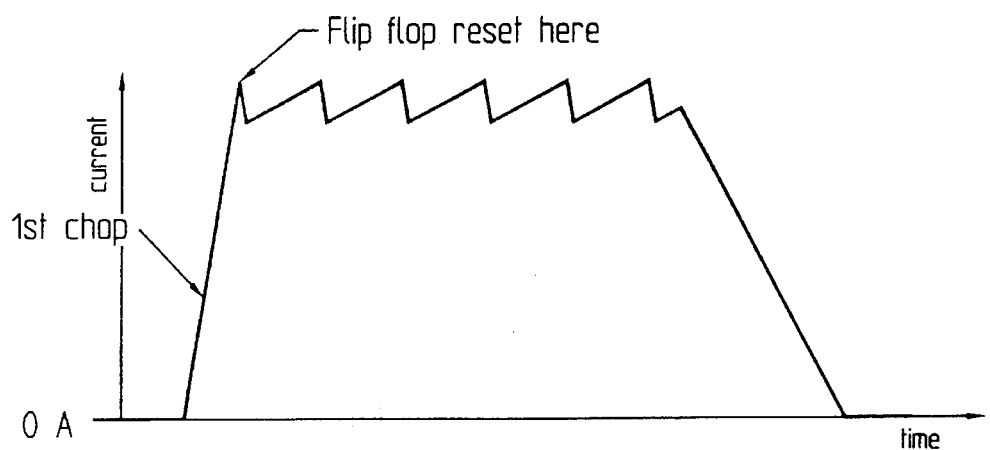
Figure 5C:
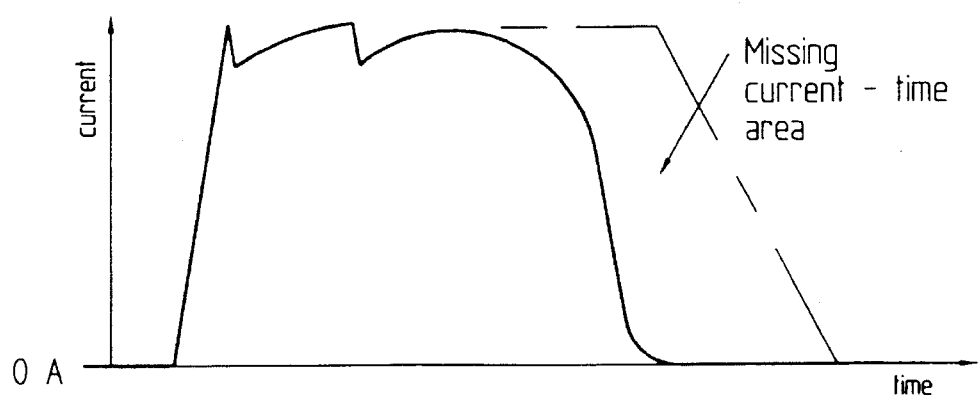
Figure 6A:
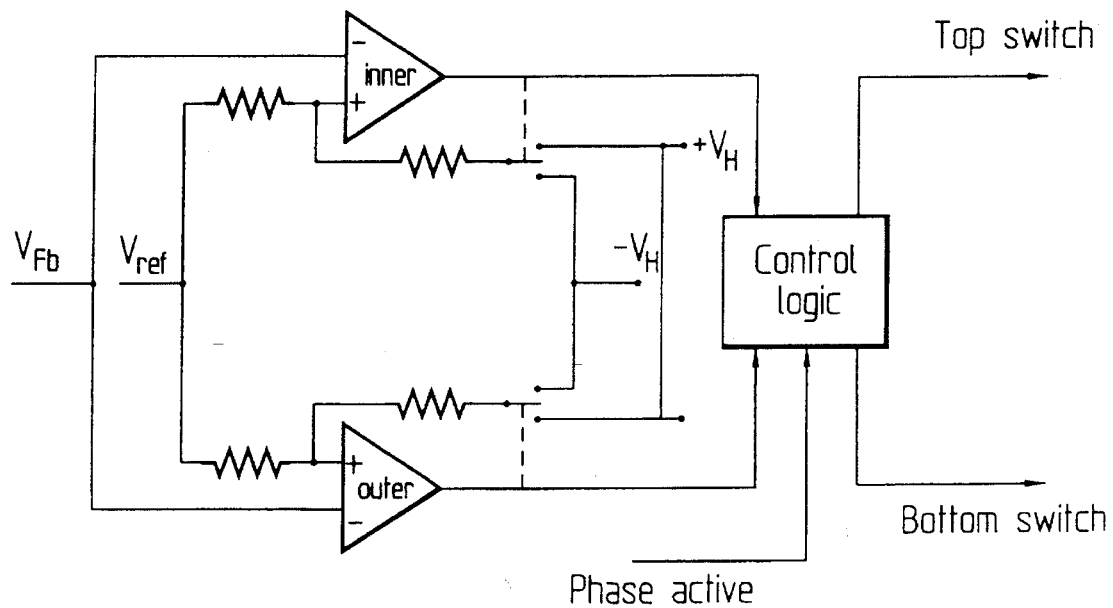
FIG. 6(a) is a schematic block diagram of a dual comparator controller.
Figure 6A:
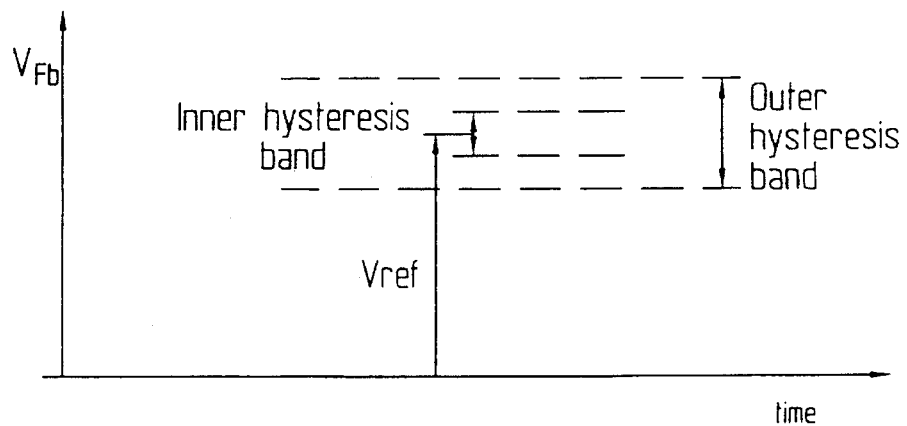
Figure 6B:
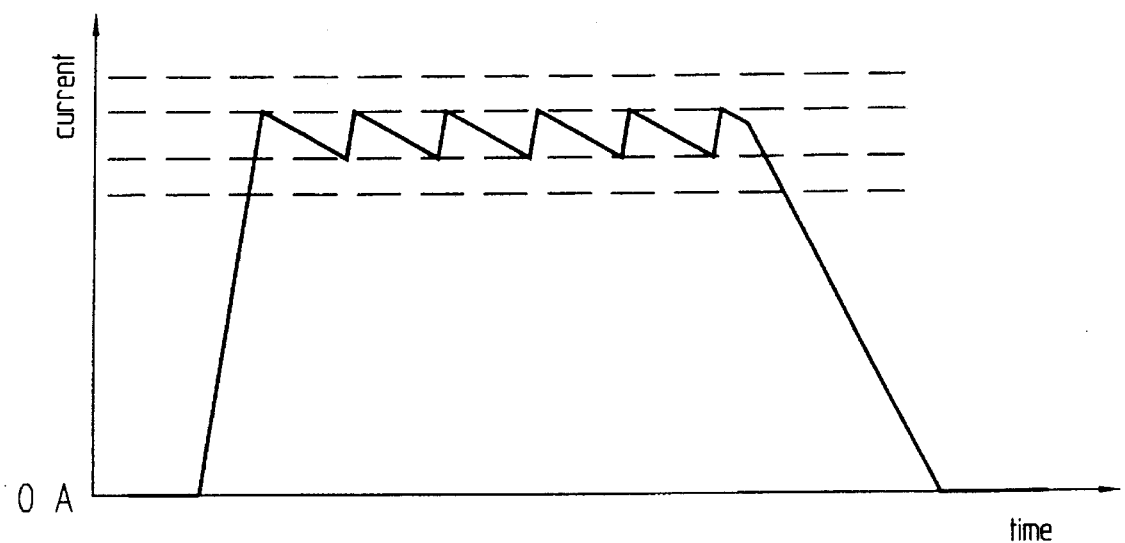
FIGS. 6(b) and (c) are winding current waveforms according to the controller of FIG. 6(a)
Figure 6C:
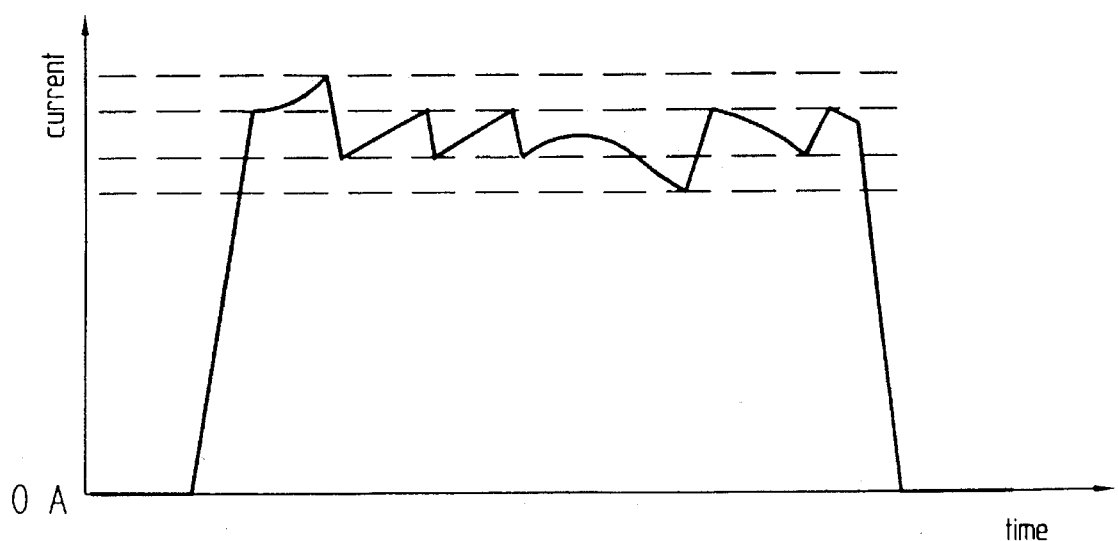

The invention works by considering the current error rather than the absolute value of winding current and essentially exploits the principle of minimum possible action by the use of a controller configuration which uses adjacent hysteresis bands. If the error is within a given band, the phase freewheels. If the error exceeds the band, then appropriate action is taken until the error reaches zero. Freewheeling is then resumed. This is achieved by the use of the two adjacent hysteresis bands which are centered about the desired current level. Each comparator handles one polarity of error, i.e. above and below the desired current level. In FIG. 7(a) the solid state analogue switches S1 and S2 are used to control the feedback around the analogue comparators X and Y. This operates as follows:

Both comparator outputs will be low whilst there is a large positive error, e.g. whilst the current is rising from zero at the start of a phase period. The comparator Y will have a hysteresis voltage applied via the switch S2, whereas the comparator X has its feedback open-circuited because of the opposite nature in which the switch S1 operates. The comparator X will therefore change state when the current reaches zero error, whereas the comparator Y will need to fall through zero, and switch when sufficient negative error is applied to its inverting input. Thus, at the start of a phase period, both comparators are low and the power circuit is in the ON state. Comparator X switches high when the error falls to zero and the phase is made to freewheel by opening either of the top and bottom winding switches t (as depicted in FIG. 1(b)).

If the current now falls (the 'motoring' case) the output of the comparator X will switch low again when the error exceeds the hysteresis value and chopping will occur between the lower limit of the comparator X and the desired current level of zero error. This is illustrated in FIG. 7(b).

If, however, the current continues to rise (the 'generating' case), the error will reverse. The comparator Y will switch once the error becomes sufficiently negative because the current exceeds the upper limit and the power circuit is then switched to the OFF state. The power circuit will force the phase current down until zero error is reached. The output of the comparator Y then goes low and freewheeling is resumed. Thus, in the generating mode, the current chops between zero error and the upper limit of the error defined by the hysteresis circuit formed around the comparator Y. This is illustrated in FIG. 7(c).

The behaviour of the circuit is summarized in the truth table of FIG. 7(d). Note that the case of X=0 and Y=1 is theoretically impossible (it implies that the current is simultaneously too low and too high). The power circuits should nevertheless behave predictably if these values occur as a transient error due, for example, to noise. The freewheel state is used under this condition.

While the analogue switches S1 and S2 are shown as being actuatable by respectively high and low signals, it will be appreciated that either switch can be substituted for its counterpart as long as an inverter is connected before the actuating input to the analogue switch to invert the output from the relevant comparator X or Y.

The hysteresis circuit illustrated is particularly useful as it allows an analogue hysteresis voltage to be controlled by the two-state output from the comparator by use of the analogue switch. Also, this form of hysteresis circuit is relatively easily adjusted by changing the hysteresis voltage applied. It will be appreciated that an alternative hysteresis circuit can be used to that described. A controller according to the invention may also include means for adjusting the upper and lower hysteresis bands as, for example, a percentage of the speed or torque of the motor or according to any other operating characteristics of the motor to which it is advantageous to link the hysteresis-based control while the machine is running.

The controller according to the invention keeps control of current under all conditions, even when braking at low speeds. Further it eliminates the need for nested hysteresis bands, so avoiding the associated difficulties referred to. It has no large transient errors and gives consistent predictable performance over the entire working current range of a given machine.

Throughout this description a conventional two switch per phase (i.e. a dual-switch forward convertor) power circuit, such as depicted in FIG. 1(b), has been assumed. The principles discussed are, however, equally applicable to any circuit which allows the motor winding current to freewheel, i.e. when the winding voltage is kept close to zero and the associated magnetic flux is therefore approximately constant.

It will be appreciated that although the invention has been described in relation to a switched reluctance machine it is equally applicable to the chopping control of current in other inductive loads. Thus, although some illustrative embodiments of the invention have been described in detail, there are many variations that come within the spirit and scope of the invention. Accordingly, the invention is to be limited only as particularly defined in the appended claims.

What is claimed is:

1. A controller for a time variable inductive load, the controller comprising:

means for deriving an error signal which is the difference between a reference signal indicative of a reference current and a feedback signal indicative of the load current;

switch means which are switchable into a freewheel arrangement in which current recirculates around the load; and switch control means for closing the switch means when the load current is below a lower current bound below the reference current, for opening the switch means when the load current is above an upper current bound above the reference current, and for switching the switch means into the freewheel arrangement when the load current reaches the reference current level from outside the lower or upper current bound.

2. A controller as claimed in claim 1 in which the switch control means comprise:

a lower hysteresis circuit having a lower hysteresis band defined between a first signal indicative of the lower current bound and the reference signal, the circuit being operable to change from one output level to another output level when the load current rises to the reference current level from a magnitude below the lower current bound and to change from its other output level back to its one output level when the load current falls below the lower current bound;

an upper hysteresis circuit having an upper hysteresis band defined between the reference signal and a second signal indicative of the upper current bound, the circuit being operable to change from one output level to another output level when the load current falls to the reference level from a magnitude above the upper current bound and to change from its other output level to its one output level when the load current rises above the upper current bound; and a control circuit responsive to the outputs of the hysteresis circuits to produce control signals for operating the switch means, such that the current is controlled in response to the deviation of the load current from the reference current, according to the states of the outputs from the hysteresis circuits, by closing the switch means when the load current is below the lower current bound, opening the switch means when the current is above the upper current bound and switching the switch means into the freewheel arrangement when the current reaches the reference current level from outside the lower or upper current bound.

3. A controller as claimed in claim 2 in which the means for producing an error signal include a differencing amplifier arranged to receive the reference and feedback signals.

4. A controller as claimed in claim 2 in which each hysteresis circuit comprises a hysteresis comparator, having an inverting input to which the error signal is applied, a non-inverting input and an analogue switch actuatable by an output of the hysteresis comparator, the analogue switch being arranged in the positive feedback loop around the hysteresis comparator by which a hysteresis voltage is applied as positive feedback, by actuation of the switch, according to the state of the output of the hysteresis comparator.

5. A controller as claimed in claim 4 in which the lower hysteresis circuit is arranged to receive a positive hysteresis voltage, the analogue switch associated with the lower hysteresis comparator being actuatable to apply the positive hysteresis voltage in response to its other output applied to the analogue switch by the output of the lower hysteresis comparator when the error is positive with respect to the reference current, the upper hysteresis circuit being arranged to receive a negative hysteresis voltage, the analogue switch associated with the upper hysteresis comparator being actuatable by its one output applied to the analogue switch by the output of the upper hysteresis comparator when the error is negative with respect to the reference current.

6. A controller as claimed in claim 2 in which the control means are responsive to a low output from both of the hysteresis circuits when the error signal is indicative of a current below the lower current bound to close the switch means, a high output from both of the hysteresis circuits when the error signal is indicative of a current above the upper current bound to open the switch means, and to actuate the freewheel arrangement when the outputs from the hysteresis circuit are dissimilar.

7. A controller as claimed in claim 2 in which each hysteresis circuit is adjustable with respect to the hysteresis band.

8. A controller as claimed in claim 2 in which the control circuit is enabled by a timing signal by which actuation of the switch means are timed to an inductance period of the load.

9. A controller as claimed in claim 2 in which the variable inductance load is at least one phase winding for a respective at least one phase of a switched reluctance machine which comprises a rotor and a stator.

10. A controller as claimed in claim 1 in which the switch means is switched into the freewheel arrangement by the switch control means when the load current reaches the reference current level from outside either one of the upper and lower current bounds.

11. A method of controlling the current in a time variable inductive load, the method comprising:

applying current to the load when the load current is below a lower current bound below a reference current level;

removing current from the load when the load current is above an upper current bound above the reference current level; and freewheeling current so that it recirculates through the load when the load current reaches the reference current level from outside the lower or upper current bound.

12. A method as claimed in claim 11, including:

applying lower hysteresis control of the load current between the reference current and the lower current bound when the load is motoring;

applying upper hysteresis control of the load current between the reference current and the upper current bound when the load is generating.

13. A method as claimed in claim 12, including timing the actuation of winding switch means to coincide with a predetermined moment in the load inductance period.

14. A circuit as claimed in claim 12, including a positive feedback network comprising serially connected first and second resistors, the first resistor being connected between the non-inverting input and ground potential and the second resistor being connected between the analogue switch and the non-inverting input.

15. A circuit as claimed in claim 12 or 13 arranged such that the polarity of the hysteresis voltage is the same as that of the output by which the analogue switch is actuatable for conduction.

16. A method as claimed in claim 11, wherein the freewheeling step further includes the step of freewheeling the current so that it recirculates through the load when the load current reaches the reference current level from outside either one of the lower and upper current bounds.

17. A controller for chop control of a switched reluctance machine which comprises a rotor, a stator, including at least one phase winding for a respective at least one phase of the machine, and winding switch means for controlling the supply of current to the windings, the switch means being switchable into a freewheel arrangement in which current recirculates around the phase winding, the controller comprising:

an error comparator for deriving an error signal output indicative of the difference between a first signal representative of a phase winding reference current and a second signal representative of phase winding current;

a motoring hysteresis circuit comprising a motoring hysteresis comparator having an inverting and a non-inverting input and an output, a positive feedback network including serially connected first and second resistors mutually connected to the non-inverted input of the motoring hysteresis comparator, an analogue switch switchable by a low output from the motoring hysteresis comparator to supply a positive hysteresis voltage to the second resistor of the positive feedback network, the first resistor being connected to ground potential, the error signal output of the error comparator being connected with the inverting input of the motoring hysteresis comparator;

a generating hysteresis circuit comprising a generating hysteresis comparator having an inverting and a non-inverting input and an output, a positive feedback network including serially connected first and second resistors mutually connected to the non-inverting input of the generating hysteresis comparator and an analogue switch switchable by a high output from the generating hysteresis comparator to supply a negative hysteresis voltage to the second resistor of the positive feedback network, the first resistor being connected to ground potential, the error signal output of the error comparator being connected with the inverting input of the generating hysteresis comparator; and a control circuit responsive to the output of the motoring and generating hysteresis comparators to switch the phase winding switch means, such that the winding current is controlled in response to the deviation of the phase winding current from the reference current, according to the states of the outputs of the hysteresis comparators, by closing the winding switch means when the deviation is below the lower current error band, opening the winding switch means when the current is above the upper current error band and switching the winding switch means into the freewheel arrangement when the current is between the upper and lower current bands.

18. A switchable hysteresis circuit comprising a comparator having a non-inverting input, an inverting input and an output providing a high or a low output signal which is dependent on the polarity of the difference between the values of the respective inputs, and an analogue switch actuatable by the output of the comparator to apply a hysteresis voltage as positive feedback to the non-inverting input of the comparator.

19. A controller for a time variable inductive load, the controller comprising:

means for deriving an error signal which is the difference between a reference signal indicative of a reference current and a feedback signal indicative of the load current;

switch means which are switchable into a freewheel arrangement in which current recirculates around the load; and switch control means for closing the switch means when a load current is below a lower current bound below the reference current, for opening the switch means when the load current is above an upper current bound above the reference current, for switching of the switch means into the freewheel arrangement when the load current rises to the reference current level from outside the lower current bound and for switching of the switch means into the freewheel arrangement when the load current falls to the reference current level from outside the upper current bound.

20. A controller as claimed in claim 19 in which the switch control means comprise:

a lower hysteresis circuit having a lower hysteresis band defined between a first signal indicative of the lower current bound and the reference signal, the circuit being operable to change from one output level to another output level when the load current rises to the reference current level from a magnitude below the lower current bound and to change from its other output level back to its one output level when the load current falls below the lower current bound;

an upper hysteresis circuit having an upper hysteresis band defined between the reference signal and a second signal indicative of the upper current bound and being operable to change from one output level to another output level when the load current falls to the reference level from a magnitude above the upper current bound and to change from its other output level to its one output level when the load current rises above the upper current bound; and a control circuit responsive to the outputs of the hysteresis circuits to produce control signals for operating the switch means, such that the current is controlled in response to the deviation of the load current from the reference current, according to the states of the outputs from the hysteresis circuits, by closing the switch means when the load current is below the lower current bound, opening the switch means when the current is above the upper current bound and switching the switch means into the freewheel arrangement when the current reaches the reference current level from outside the lower or upper current bound.

21. A controller as claimed in claim 19 in which the switch means is switched into the freewheel arrangement by the switch control means when the load current reaches the reference current level from outside either one of the upper and lower current bounds.

22. A method of controlling the current in a time variable inductive load, the method comprising:

applying current to the load when the load current is below a lower current bound below a reference current level;

removing current from the load when the load current is above an upper current bound above the reference current level; and initiating freewheeling current so that current recirculates through the load when the load current rises to the reference current level from outside the lower current bound and so that current recirculates through the load when the load current falls to the reference current level from outside the upper current bound.

23. A method as claimed in claim 22, including:

applying lower hysteresis control of the load current between the reference current and the lower current bound when net flow of energy is to the load; and applying upper hysteresis control of the load current between the reference current and the upper current bound when net flow of energy is from the load.

* * * * *